March 4, 1947.          J. W. HINGLEY              2,416,921
                          TOWING DEVICE
                       Filed Sept. 12, 1944        2 Sheets-Sheet 1

INVENTOR
James W. Hingley
BY
ATTORNEYS.

March 4, 1947.       J. W. HINGLEY              2,416,921
                      TOWING DEVICE
                  Filed Sept. 12, 1944        2 Sheets-Sheet 2

WITNESS:

INVENTOR
James W. Hingley
BY
ATTORNEYS.

Patented Mar. 4, 1947

2,416,921

UNITED STATES PATENT OFFICE 2,416,921

TOWING DEVICE

James W. Hingley, Chester, Pa.

Application September 12, 1944, Serial No. 553,724

3 Claims. (Cl. 280—33.44)

This invention relates to a towing device.

More particularly this invention relates to a device adapted to be removably attached to a motor vehicle chassis for the towing of a second motor vehicle.

The device according to this invention is of simple design and may be constructed at relatively small cost. At the same time, it will lend itself to the efficient towing of a motor vehicle without the necessity for providing anyone to steer the towed vehicle.

Generally speaking the device according to this invention will be constructed to be rigidly secured to the members of the frame of a motor vehicle and to be pivotally secured to a vehicle to be towed. The device will be so arranged as to support the front end of the towed vehicle as well as to act as a towing connection and, at the same time, will control the towed vehicle to cause it to follow the towing vehicle.

Having now indicated, in a general way, the nature and purpose of this invention, I will proceed to a detailed description of a preferred embodiment thereof with exemplification of its practical use, all with reference to the accompanying drawings, in which.

Figure 1:
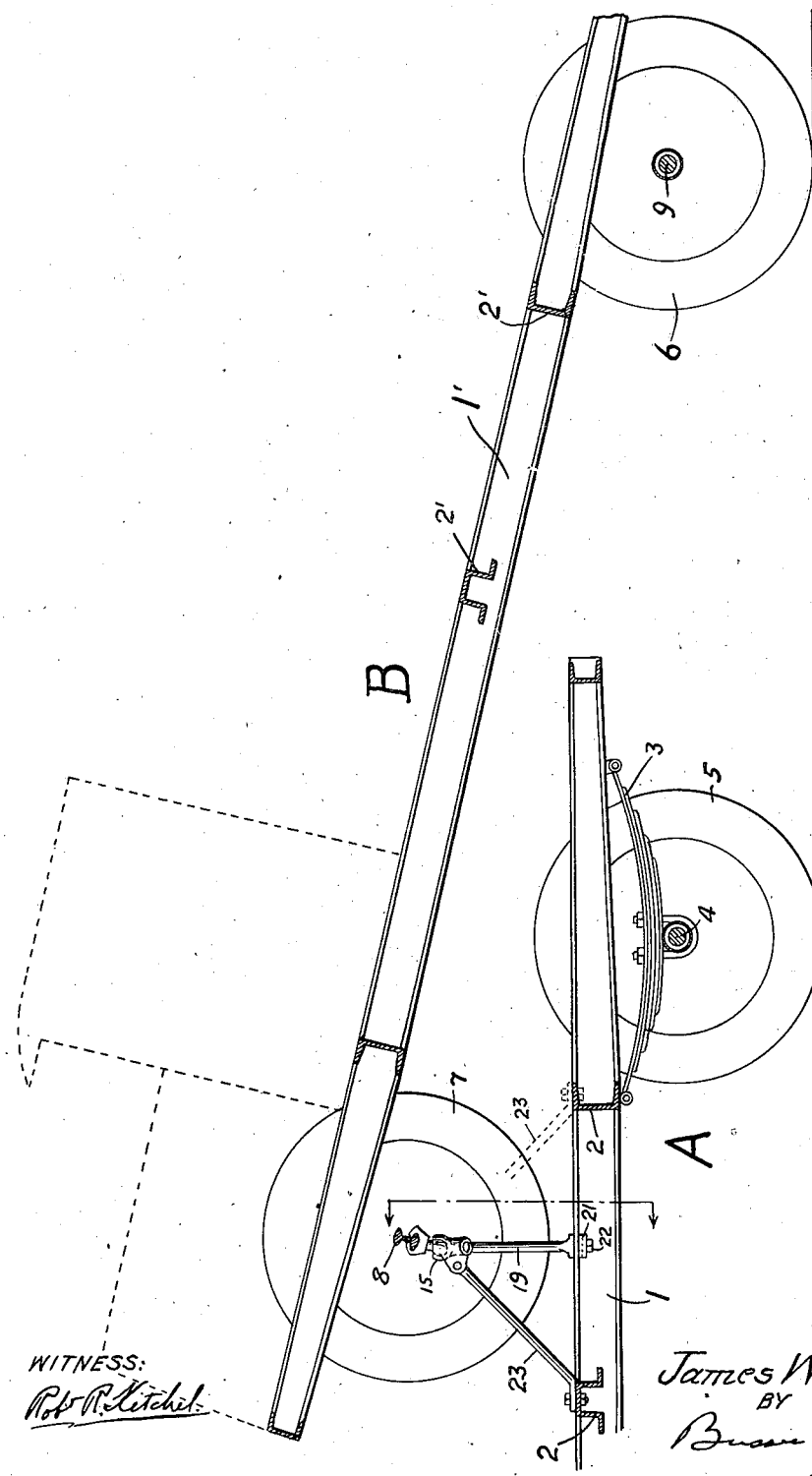
Figure 1 is a view, partly in section, showing an embodiment of the device according to this invention in combination with the essential parts of two motor vehicles in towing relation.
Figure 3:
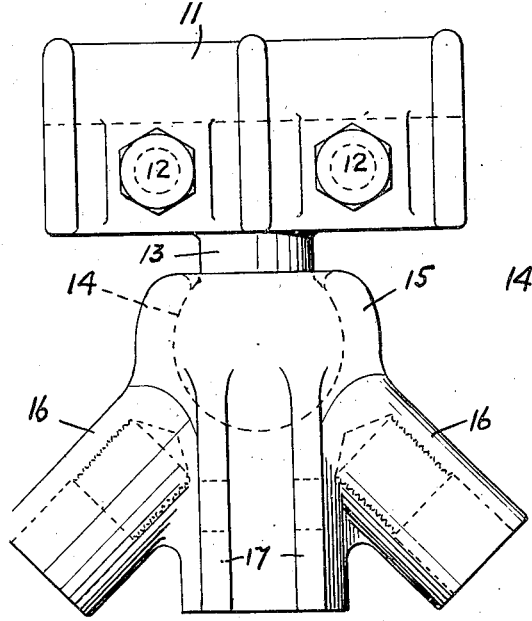
Figure 3 is a view showing details of construction of elements of the device shown in Figure 1.
Figure 4:
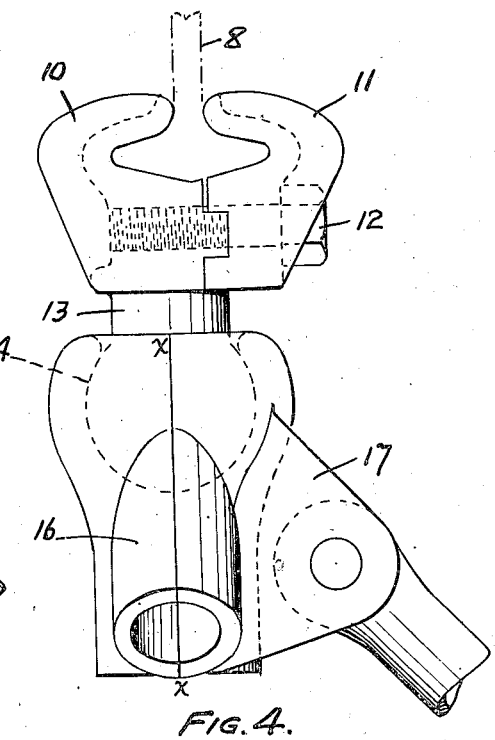
Figure 4 is a view of the subject of Figure 3 taken at right angles.

In the several figures, variously 1, 1 indicates the side members of the frame of a motor vehicle A, as, for example, a motor truck, and 2, 2 indicate cross members of the frame of the vehicle. The frame, comprising the members 1 and 2, is a typical motor truck frame supported at the rear on springs 3, mounted on rear axle 4, carrying the usual wheels 5. The frame is mounted on front wheels, not shown, as is usual in motor vehicle construction.

1', 1' indicates the side members of the frame of a second motor vehicle B, which may be a motor truck to be towed, while 2', 2' indicate the cross members of the frame.

The frame comprising the members 1' and 2' is mounted on front and rear wheels 6, 7, respectively mounted on a front axle 8 and a rear axle 9, as is usual in motor vehicle construction.

For securing the vehicles in towing relation, as they are shown in Figure 1, the device according to this invention, as shown, comprises a clamp member comprising a pair of jaws 10, 11, adapted to be engaged with the front axle 8, of the vehicle B to be towed, and to be clamped thereto by means of bolts 12, 12. It will be understood that the front axle 8 of the vehicle B may be of any form and that the jaws 10 and 11 will be formed to conform thereto.

Extending from one of the jaws, as the jaw 10, is a stem 13 terminating in a ball 14. The stem and ball may be formed integral with the jaw or secured thereto in any convenient manner, as by welding, threading, or the like.

A socket member or head 15, adapted to receive the ball 14, is provided with a pair of oppositely positioned tubular extensions 16, 16 rigidly connected thereto, which extend downwardly from the socket at an angle, and with a clevis member 17 positioned between the tubular extensions substantially 90° from each tubular extension. The socket member 15 may be conveniently made in two parts and welded together on line x—x after assembly with the ball 14.

Figure 2:
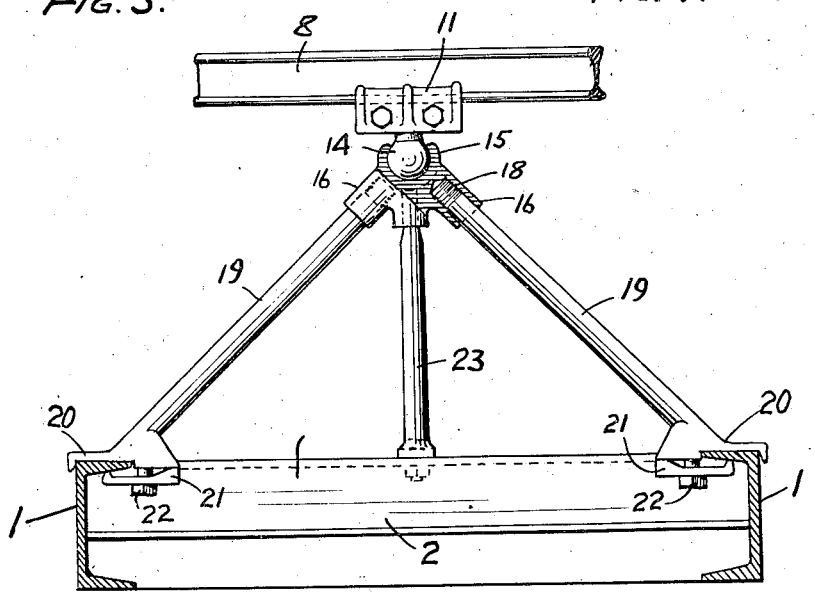
Figure 2 is a view, partly in section, showing details of construction of the device shown in Figure 1 as applied to two vehicles in towing relation.

The tubular extensions 16, 16 are internally threaded, as shown at 18, 18, Figure 2, for a distance from the bottom of the bores therein, the walls of the bores being smooth adjacent their open ends.

The tubular extensions 16, 16 from the socket member 15 are adapted to receive the ends of a pair of support members 19, 19, the ends of which are threaded for engagement with the threading 18, 18, into engagement with which the supports are guided by the smooth portions of the bores in the extensions.

The supports are provided with flanged feet 20, 20 adapted to engage with the side members 1, 1 of the vehicle A, as shown in Figure 2, and clamps 21, 21 are provided to be secured to the feet 20, 20 by bolts 22, 22 to securely clamp the supports 19, 19 to the frame members of the vehicle A.

A third support 23 is arranged to be secured, by a bolt 24 to the socket member or head 15 through the clevis 17 extending therefrom. The support 23 is provided with a foot 24 adapted to be bolted to a cross member 2 of the frame of vehicle A, as shown in Figure 1.

The supports 20, 20 and 23, together with the head 15, form a tripod for supporting the vehicle to be towed.

In use of the device according to this invention, the ball 14 and jaws 10, 11 having been assembled with the socket member 15 and the supports 19, 19 and 23 having been connected to the socket member, the supports 19, 19 will be clamped to the side members of the frame of vehicle A at a convenient distance from the rear end thereof. The support 23 will then be bolted to a cross member of the frames. The support 23 may extend forwardly or rearwardly from the socket member 15, depending upon the location of a cross member 2 to which it may be conveniently bolted.

The device having been secured to the frame of vehicle A, as described, the vehicle A will be moved to the location of vehicle B to be towed. The front end of vehicle B will then be lifted, by any suitable hoisting mechanism, brought over the rear end of the vehicle A and the jaws 10, 11 clamped to its front axle.

The vehicle B may now be towed by the vehicle A and in towing will follow the vehicle A.

As will be appreciated, the exact position in which the device is mounted on the vehicle A, the length of the supports, and the like, will not be important so long as the supports are of such length and the device is so mounted that the front part of vehicle B, when secured to the device, will clear the rear part of the vehicle A.

The device according to this invention will be found to possess the great practical advantage of being capable of production with minimum weight and to be readily disassembled, the parts then lending themselves to convenient packaging for carrying to a place of use, where the device is readily assembled and mounted on a towing vehicle.

As will be appreciated, various modifications may be made in the device described above in detail without departing from the scope of this invention as defined in the appended claims.

What I claim and desire to protect by Letters Patent is:

1. A towing device comprising, a socket member, a pair of supports extending oppositely from said socket member at a downward angle, means for securing said supports to the side members of the frame of a tow vehicle, a third support extending downwardly from said socket member and at an angle to the said first support, means to secure said third support to a cross member of the frame of the tow vehicle intermediate of the side frame members; a ball member engaged with the socket member and means to secure a ball member to the front axle of a vehicle to be towed.

2. A towing device comprising, a socket member, a pair of supports rigidly connected to said socket member and extending oppositely therefrom downwardly at an angle, means for securing said supports to the side members of the frame of a tow vehicle, a third support pivotally connected to said socket member between the first supports and arranged to extend laterally therefrom, means to secure said third support to a cross member of the frame of the tow vehicle, a ball member engaged with the socket member and a pair of jaws carried by the ball member for clamping the ball member to the front axle of a vehicle to be towed.

3. A towing device comprising a tripod arranged to be mounted on a tow vehicle, means carried by the head of the tripod arranged to be connected to the front axle of a vehicle to be towed, two of the legs extending downwardly and laterally from the head, the other leg extending downwardly and outwardly from the head at substantially 90° from the other legs, and means for securing the lower end of each leg to the tow vehicle.

JAMES W. HINGLEY.

REFERENCES CITED

The following references are of record in the file of this patent:

UNITED STATES PATENTS

| Number | Name | Date |
|---|---|---|
| 1,324,934 | Shand | Dec. 16, 1919 |
| 2,152,279 | Rendall et al. | Mar. 28, 1939 |
| 1,662,923 | Hume | Mar. 20, 1928 |
| 1,377,609 | Townsend | May 10, 1921 |